United States Patent Office 3,647,728
Patented Mar. 7, 1972

3,647,728
PREPARATIONS OF POLYADDITION PRODUCTS, PROCESSES FOR THEIR MANUFACTURE AND USE
Alberto Deflorin, Riehen, Heinz Abel and Alfred Berger, Reinach, Basel-Land, Richard Casty, Kaiser-Augst, and Rosemarie Toepfl, Basel, Switzerland, assignors to Ciba Limited, Basel, Switzerland
No Drawing. Filed July 29, 1969, Ser. No. 845,881
Claims priority, application Switzerland, Aug. 8, 1968, 11,948/68
Int. Cl. C08g 41/04
U.S. Cl. 260—18
8 Claims

ABSTRACT OF THE DISCLOSURE

Polyaddition products are prepared by reacting epoxides with basic polyamides in an equivalent ratio of 1:1 to 1:5. The polyamides are from polymeric unsaturated fatty acids and polyalkylene polyamines. The reaction is carried out in the presence of organic solvents at at most 80° C. No later than after completion of the reaction, it is ensured that a sample of the reaction mixture has a pH-value of 2 to 8 after dilution with water. The resulting polyaddition products are soluble or dispersible in water and are useful in the textile industry e.g. for rendering wool non-felting or for rendering textiles water repellent, when applied in combination with silicone oils.

---

It has been found that valuable new stable preparations of polyaddition products of epoxides and amino compounds are obtained if epoxides are reacted with basic polyamides from polymeric, preferably dimeric to trimeric, unsaturated fatty acids and polyalkylene polyamines in an equivalent ratio of 1:1 to 1:5, in the presence of organic solvents at temperatures of at most 80° C. to give polyaddition compounds which are soluble or dispersible in water, and steps are taken through the addition of acid not later than after completion of the reaction to ensure that a sample of the reaction mixture has a pH-value of 2 to 8 after addition of water.

The epoxides to be used as starting substances should contain at least two epoxy groups in the molecule and should be in the monomolecular to at most slightly polymerised state, that is to say they should have a high content of reactive epoxy groups, and appropriately an epoxy equivalent of at most 1000. It is for example possible to use epoxides with epoxy groups bonded to cyclic residues or preferably with epoxy groups bonded to aliphatic residues, such as the reaction products of epichlorhydrin and ethylene glycol or glycerine, but especially reaction products of epichlorhydrin and so-called bis-phenols such as 2,2 - di - (4' - hydroxyphenyl)propane.

Possible polymeric unsaturated fatty acids for the manufacture of the basic polyamides are for example dimerised to trimerised linoleic or linolenic acid. The polyamides are obtained by condensation with polyamines, especially aliphatic polyamines such as diethylenetriamine, triethylenetetramine or tetraethylenepentamine, that is to say amines of formula (1) $H_2N-(CH_2-CH_2-NH)_n-CH_2-CH_2-NH_2$ wherein $n$ is 1, 2 or 3 and can, in the case of mixtures, also assume a non-integral average value, for example between 1 and 2. The polyamides must be basic, and this is achieved by using, in the polyamide condensation, an excess of amino groups ($H_2N-$ and alkylene-NH-alkylene) in comparison to the carboxylic acid groups.

The epoxides are reacted with the basic polyamides in an equivalent ratio of 1:1 to 1:5. An epoxide group equivalent is to be understood as the amount of epoxide in grams which is equivalent to one mol of monoepoxy compound, and the amino group equivalent is to be understood as the amount of basic polyamide equivalent to one mol of monoamine. The equivalent values can be determined in a known manner.

The polyaddition products of epoxides and polyamides can optionally also be obtained with the conjoint use of a third component, namely a monofunctional compound. These monofunctional compounds possess a mobile halogen atom, or a vinyl, acid, ester, acid anhydride, isocyanate or epoxide group as functional groups or atoms.

If the polyamide component is designated (a), the at least difunctional epoxide designated (b) and the monofunctional component designated (c), then appropriately about 0.25 mols of the monofunctional compound (c) are employed per one amino group equivalent of the component (a), though this content can also be increased up to for example 0.5 mols per amino group equivalent.

These monofunctional compounds (=component (c)) are preferably aralkyl or alkyl halides, nitriles, or amides of acids of the acrylic acid series, aliphatic or aromatic carboxylic acids, their esters or anhydrides, as well as aliphatic or aromatic isocyanates or epoxides.

Substances which are advantageously employed as monofunctional components (c) are alkyl halides such as ethyl bromide or butyl chloride or aralkyl halides such as benzyl chloride; nitriles or amides of acrylic or methacrylic acid such as acrylonitrile or acrylamide; alkanecarboxylic acids with up to 18 carbon atoms such as coconut fatty acid or stearic acid, or their esters with alkanols containing at most 5 carbon atoms, for example methanol, ethanol or n-butanol, or their anhydrides such as acetic anhydride; aromatic isocyanates such as phenylisocyanate; or aliphatic or aromatic epoxides such as propylene oxide, butylene oxide, dodecene oxide or styrene oxide.

Particularly suitable components (c) are alkylene oxides with at most 12 carbon atoms, alkanecarboxylic acids with at most 18 carbon atoms, monocyclic aralkyl halides or acrylonitrile.

The sequence in which the reaction of the polyamides with the monofunctional and polyfunctional compounds takes place is of subordinate importance. It is possible first to react the polyamides with a monofunctional compound and then with the polyfunctional epoxide, or also vice versa. In some cases, if there are no great differences in the reactivity, the reaction can also be carried out simultaneously.

Further, the reaction is preferably carried out in the presence of water-soluble organic solvents, and appropriately those which are miscible with water in any desired proportions. Dioxane, isopropanol, ethanol and methanol, ethylene glycol n-butyl ether and diethylene glycol mono-n-butyl ether may be mentioned as examples.

At the same time it is however also possible to carry out the reaction in the presence of water-insoluble organic solvents, for example in hydrocarbons such as petrol, benzene, toluene or xylene; halogenated hydrocarbons such as methylene chloride, methylene bromide, chloroform, carbon tetrachloride, ethylene chloride, ethylene bromide, s-tetrachlorethane and above all trichlorethylene.

The reaction to give the polyaddition product is carried out in such a way that polyaddition products which are soluble or dispersible in water are produced, by adjusting the pH-value, not later than after completion of the reaction, to 2 to 8, preferably to 2 to 7, but especially to 5 to 6. To adjust this pH-value, inorganic or organic acids are for example used, advantageously easily volatile organic acids such as a low molecular carboxylic acid e.g.

with 1 to 3 carbon atoms, as formic acid or acetic acid. It is advisable to add a certain amount of acid to the reaction mixture immediately or shortly after starting to combine the basic polyamide with the epoxide, and also to add further acid continuously or in stages during the further reaction. Furthermore, the process is preferably carried out at temperatures of 25 to 80° C. especially 45 to 70° C. The solutions or dispersions thus obtained, which are adjusted with acid to the pH-value mentioned and are appropriately adjusted to a 10 to 30% content of polyaddition product by means of an organic solvent or preferably by means of water, and which are in most cases slightly opalescent to cloudy solutions, are distinguished by high stability.

Products with advantageous properties are also obtained if after addition of the acid and the water the preparation is further stored at room temperature or elevated temperature, for example for 4 hours at 70° C. or for a longer period at a lower temperature.

The products can be used for various purposes, above all in the textile industry. Thus they are suitable for rendering textiles water-repellent, in combination with silicone oils. For this purpose, silicone oil emulsions and the preparations containing the polyaddition compounds of the indicated composition are applied to the textile material and the latter thereafter subjected to a heat treatment, advantageously at temperatures of 130 to 170° C. Texiles of various kinds, for example polyacrylonitrile fibres or polyester fibres, but especially fibres of regenerated or native cellulose, such as cotton, but also mixed fabrics, for example of cotton and polyester, can in this way be given a wash-proof water-repellent finish.

Possible silicones are for example the known alkylhydrogen-polysiloxanes, optionally in combination with dialkylpolysiloxanes. The quantity ratios of the two materials to be used may vary within relatively wide limits. They are for example 1:0.05 to 1:1 between the polysiloxane compound and the basic polyamide, both being calculated without solvent or diluent. If desired, particularly if relatively little polyaddition compound is used, the known cure catalysts for the silicones, for example zinc or zirconium compounds, such as zinc octoate or zirconium acetate, can additionally be employed.

An advantageous procedure to follow is to apply an aqueous preparation which contains the silicone oil and the polyaddition product, onto the textile material, for example by spraying, spreading or dipping, especially on a padder, then to dry the material at a moderately elevated temperature, for example at 100° C., and finally to subject it to a heat treatment at temperatures of 130 to 170° C. for 8 to 2 minutes.

Further, the preparations of the initially mentioned kind are suitable for rendering wool non-felting, wherein the wool is impregnated with an aqueous liquor to which the preparation and, if desired, yet further additives such as wetting agents, dispersing agents and/or acid have been added, then dried and subjected to a treatment at elevated temperature. A process which proves particularly advantageous is however a process for the dyeing and non-felting treatment of wool, in which the wool is, successively in optional sequence and using the exhaustion method, on the one hand dyed and on the other hand treated at temperatures of 35 to 100° C. and a pH-value of 7 to 3 with the preparations of epoxides and basic polyamides. The dyeing and non-felting treatment can thereby be combined in a simple manner and carried out in the same apparatus, without the wool having to be taken out of the apparatus between the two processes. However, the non-felting treatment can also be carried out following a padding process.

Dyeing can herein be carried out in the usual manner which is in itself known, with any desired dyestuffs which can be used for wool, for example acid wool dyestuffs, 1:1- or 1:2-metal complex dyestuffs or reactive dyestuffs. Equally, the additives which are usual in dyeing wool, such as sulphuric acid, acetic acid, sodium sulphate, ammonium sulphate and levelling agents can be used, with possible levelling materials being above all polyglycol compounds of higher aliphatic amines, which can optionally also be quaternised and/or esterified with polybasic acids at the hydroxyl groups.

The liquor which serves for the non-felting treatment contains, in addition to the preparation of the polyaddition product, also the acid required for the adjustment of the acid medium and furthermore, advantageously, salts such as sodium sulphate or ammonium sulphate. The amount of polyaddition product (not counting solvent and water) is appropriately 0.5 to 5% relative to the weight of wool. As has been mentioned, the process is carried out at temperatures of 35 to 100° C. and in most cases between 20 and 80 minutes are here required for a far-reaching to practically complete fixing of the polyaddition product.

The sequence of the two processes is optional but in general it tends to be advantageous to dye first and then to apply the non-felting treatment. A dispersing agent, for example a reaction product of naphthalenesulphonic acid and formaldehyde, is advantageously added to the second treatment bath, regardless of whether this second bath is the dye bath or the bath with the polyaddition product, and in fact this addition is made first, that is to say before the remaining constituents were added. The combined process for the dyeing and non-felting treatment of wool is particularly suitable in actual package dyeing where the goods being dyed are stationary and the liquor is moved.

Advantageous non-felting effects are furthermore achieved by adding oxidising agents such as hydrogen peroxide to the treatment baths.

When using treatment baths with a high content of organic, above all water-insoluble, solvents or even baths which are anhydrous and only contain organic solvents, closed equipments are appropriately used, for example of the kind used in dry cleaning.

Furthermore, the preparations of the polyaddition products of the nature indicated are also suitable for use as hair setting agents. The preparations can further be used as wet strength agents for paper.

If the preparations are used in combination with an amino-plastic pre-condensate on textiles, especially cotton, a wash-resistant "soil release" effect is achieved.

Furthermore, dyestuffs, especially reactive dyestuffs, are well fixed to textiles, especially wool, with the aid of preparations containing the present polyaddition products and this manifests itself in an improved fastness to perspiration.

Further, the finishes using the present polyaddition products also improve the mechanical properties, for example tear strength, elongation at break, abrasion resistance and tendency to pilling of the treated textile material.

EXAMPLE 1

Equivalent ratio epoxy:amine=1

A solution of 49.4 g. of a condensation product of polymerised linoleic acid and diethylenetriamine having an amine equivalent weight of 247 and 49.4 g. of methanol is added over the course of 24 minutes, with good stirring, to a solution, warmed to 51° C., of 38.4 g. of an epoxide formed from 2,2-bis-(4'-hydroxyphenyl)-propane and epichlorhydrin, having an epoxide equivalent weight of 191, and 38.4 g. of methanol, the reaction temperature being 51 to 53° C. After 8 and again after 18 minutes from the beginning of the dropwise addition 3 g. of glacial acetic acid are added, and after 24 minutes a further 2 g. of glacial acetic acid are added. The reaction is continued for a further 2 hours and 35 minutes at 55 to 60° C. The reaction product is then soluble in water to form an opalescent solution. Thereafter 4 g. of glacial acetic acid and 273.4 g. of water are added with stirring. A yellowish viscous cloudy 20% strength solution with a pH-value of 5.2 is obtained.

EXAMPLE 2

Equivalent ratio epoxy:amine=0.5

A solution of 98.8 g. of a polyamide resin according to Example 1 with an equivalent weight of 247, and 98.8 g. of methanol is added dropwise over the course of 30 minutes, with good stirring, to a solution of 38.4 g. of an epoxide according to Example 1, having an epoxide equivalent weight of 191, and 38.4 g. of methanol, warmed to 52° C. After 10, 20 and 30 minutes following the start of the addition, 6, 6 and 4 g. of glacial acetic acid are added, and the temperature is further maintained at 57° C. About one hour and 40 minutes after completion of the addition a further 8 g. of glacial acetic acid and 466.6 g. of water are added. A cloudy 20% strength solution of low viscosity is obtained, having a pH-value of 5.1.

EXAMPLE 3

Equivalent ratio epoxy:amine=0.25

A solution of 98.8 g. of a polyamide according to Example 1, having an amine equivalent weight of 247, and 98.8 g. of methanol is introduced over the course of 40 minutes, with good stirring, into a solution of 19.1 g. of an epoxide according to Example 1, having an epoxide equivalent weight of 191, and 19.1 g. of methanol, the reaction temperature being 50° C. After one-third of the solution has been introduced, 6 g. of glacial acetic acid are added, a further 6 g. of glacial acetic acid are added after two-thirds of the solution have been introduced, and 4 g. of glacial acetic acid are added after completion of the introduction. After about 22 minutes post-reaction at 60° C., a further 8 g. of glacial acetic acid are added, the mixture is cooled to room temperature, and the clear reaction product is stirred into 450 g. of water. The resulting clear solution has a solids content of 20% and a pH-value of 5.4.

EXAMPLE 4

Equivalent ratio epoxy:amine=1.0

36.5 g. of a condensation product from polymerised linoleic acid and polyamines (mixture of diethylenetriamine and triethylenetetramine), having an amine equivalent weight of 183, dissolved in 36.5 g. of methanol, are added over the course of 37 minutes, at 54 to 61° C. and with good stirring, to a solution of 38.4 g. of an epoxide according to Example 1 having an epoxide equivalent weight of 191, and 38.4 g. of methanol. 10 minutes after the start of the addition 3 g. of glacial acetic acid are added, and 2 g. of glacial acetic acid are added after completion of the addition. After one hour and 30 minutes of post-reaction at the same temperature, a further 4 g. of glacial acetic acid are added, the mixture is cooled to room temperature, and the reaction product is stirred into 258.7 g. of water. The 20% strength slightly cloudy solution has a pH-value of 5.1.

EXAMPLE 5

Equivalent ratio epoxy:amine=0.5

73.4 g. of a polyamide according to Example 4, having an amine equivalent weight of 183, dissolved in 73.4 g. of methanol are added over the course of 27 minutes at 55 to 67° C., with good stirring to a clear solution of 38.4 g. of an epoxide according to Example 1, having an epoxide equivalent weight of 191, and 38.4 g. of methanol. 6 g. of glacial acetic acid are added after one-third of the solution has been added, 6 g. of glacial acetic acid after two-thirds of the solution have been added dropwise, and 4 g. of glacial acetic acid after completion of the dropwise addition of the solution. After 55 minutes post-reaction at 60 to 62° C. a further 8 g. of glacial acetic acid are added and after cooling the reaction product is poured into 432.4 g. of water. The pH-value of the clear solution of low viscosity is 5.4.

EXAMPLE 6

Equivalent ratio epoxy:amino=0.25

73.4 g. of a polyamide according to Example 4, dissolved in 73.4 g. of methanol, are added over the course of 30 minutes, whilst stirring, to a solution of 19.1 g. of of an epoxide according to Example 1, having an epoxide equivalent weight of 191, and 19.1 g. of methanol, warmed to 55° C. 6 g. of glacial acetic acid are added after an 8 minute period of addition, 6 g. of glacial acetic acid after a further 7 minutes and 4 g. of glacial acetic acid after completion of the introduction. The reaction temperature is 55 to 67° C. After 9 minutes post-reaction at 60 to 62° C. 8 g. of glacial acetic acid are added, the mixture is cooled to room temperature and the reaction product is stirred into 376 g. of water. The solution thus obtained has a solids content of 20% and a pH-value of 5.4.

EXAMPLE 7

Equivalent ratio epoxy:amine=1.0

A solution of 32.8 g. of a condensation product from polymerised linoleic acid and polyalkylenepolyamine having an amine equivalent weight of 164, and 32.8 g. of methanol is added over the course of 30 minutes, with stirring, to a solution consisting of 38.4 g. of an epoxide according to Example 1, having an epoxide equivalent weight of 191, and 38.4 g. of methanol, warmed to 57° C. 3 g. of glacial acetic acid are added 10 minutes and again 20 minutes following the start of the introduction of the solution, and a further 2 g. of glacial acetic acid are added 30 minutes after the start if the introduction of the solution. After a post-reaction period of one hour and 45 minutes at 56 to 57° C. a further 4 g. of glacial acetic acid are added and the product cooled to room temperature is stirred into 260.6 g. of water. The strongly opalescent 20% strength solution of low viscosity has a pH-value of 5.3.

EXAMPLE 8

Equivalent ratio epoxy:amine=0.5

65.6 g. of a polyamide according to Example 7, having an amine equivalent weight of 163, dissolved in 65.6 g. of isopropanol, are added dropwise over the course of 40 minutes at 55° C., with stirring, to a solution of 38.4 g. of an epoxide according to Example 1, having an epoxide equivalent weight of 191, and 38.4 g. of isopropanol. 6 g. of glacial acetic acid are added 15 minutes after the start of the dropwise addition, 6 g. of glacial acetic acid 25 minutes after the start of the dropwise addition and a further 4 g. of glacial acetic acid 40 minutes after the start of the dropwise addition. After one hour 30 minutes post-reaction 8 g. of glacial acetic acid are added and the mixture cooled to room temperature. The 20% strength solution obtained after addition of 408 g. of water has a pH-value of 5.4.

EXAMPLE 9

Equivalent ratio epoxy:amine=0.25

65.6 g. of a polyamide according to Example 7, having an amine equivalent weight of 163, dissolved in 65.6 g. of methanol are added at 53° C. over the course of 28 minutes, whilst stirring, to a solution of 19.2 g. of an epoxide according to Example 1, having an epoxide equivalent weight of 191, and 19.2 g. of methanol. The reaction temperature rises to 57° C. 6 g. of glacial acetic acid are added after one-third of the solution has been introduced, 6 g. of glacial acetic acid after two-thirds of the solution have been introduced and 4 g. of glacial acetic acid after completion of the introduction of the solution. The reaction is continued for a further 12 minutes at 60° C. and the reaction product is then mixed with 8 g. of glacial acetic acid, cooled and introduced into 351.4 g. of water. The 20% strength solution has a pH-value of 5.6.

EXAMPLE 10

Equivalent ratio epoxy:amine=0.25

73.4 g. of a polyamide according to Example 4, having an amine equivalent weight of 183, dissolved in 73.4 g. of methanol, are added over the course of 30 minutes, with stirring, to a solution of 38.5 g. of an epoxide formed from 2,2-bis-(4'-hydroxyphenyl)-propane and epichlorhydrin, having an epoxide equivalent weight of 385, and 38.5 g. of methanol, warmed to 55° C. 6 g. of glacial acetic acid are added after the addition of one-third of the solution, 6 g. of glacial acetic acid after the addition of two-thirds of the solution and 4 g. of glacial acetic acid after completion of addition of the solution, and the mixture is allowed to react further at 55 to 59° C. About 25 minutes after completion of the introduction, 8 g. of glacial acetic acid are added, the mixture is cooled to room temperature and the reaction product is stirred into 432.2 g. of water. The 20% strength slightly opalescent solution has a pH-value of 5.6.

EXAMPLE 11

Equivalent ratio epoxy:amine=0.5

A solution of 77 g. of the epoxide according to Example 10, having an epoxide equivalent weight of 385, and 75 g. of methanol is mixed at 58 to 60° C., over the course of 30 minutes, with a solution of 65.6 g. of a polyamide according to Example 7, having an amine equivalent weight of 164, and 65.6 g. of methanol, 6 g. of glacial acetic acid are added 8 minutes after the start of the introduction, 6 g. of glacial acetic acid 17 minutes after the introduction and 4 g. of glacial acetic acid 30 minutes after the start of the introduction. After about 65 minutes reaction time at 57 to 62° C., a further 8 g. of glacial acetic acid are added. After cooling to room temperature and stirring the reaction product into 523.8 g. of water, a 20% strength solution of low viscosity having a pH-value of 5.5 is obtained.

EXAMPLE 12

Equivalent ratio epoxy:amine=0.25

98.8 g. of a polyamide according to Example 1, having an amine equivalent weight of 247, are warmed to 53° C. 19.1 g. of an epoxide according to Example 1, having an epoxide equivalent weight of 191, dissolved in 19.1 g. of butyl glycol are added dropwise over the course of 40 minutes with good stirring, simultaneously with 24 g. of glacial acetic acid. After 50 minutes post-reaction at 55 to 59° C., 549 g. of water are added. After cooling, the 19% strength solution shows a pH-value of 5.3.

EXAMPLE 13

Equivalent ratio epoxy:amine=0.25

69.2 g. of a polyamide according to Example 1 having an amine equivalent weight of 247 are dissolved in 35 g. of n-butylglycol and warmed to 57° C. internal temperature. A solution of 13.4 g. of an epxide according to Example 1, having an epoxide equivalent weight of 191, in 35 g. of n-butylglycol is added dropwise over the course of 30 minutes with good stirring. 30 minutes thereafter a sample is soluble in 220 g. of water containing 8 g. of glacial acetic acid to give a clear solution.

Thereafter 8 g. of glacial acetic acid in 220 g. of n-butylglycol are added. A clear solution of low viscosity is obtained, having a solids content of 20% and a pH-value of 7.0.

EXAMPLE 14

Equivalent ratio epoxy:amine=0.25

98.8 g. of a polyamide according to Example 1, having an amine equivalent weight of 247, are warmed to 53° C. 19.1 g. of an epoxide according to Example 1, having an epoxide equivalent weight of 191, dissolved in 19.1 g. of n-butylglycol, and 24 g. of glacial acetic acid are added dropwise simultaneously over the course of 40 minutes, with good stirring. After 50 minutes post-reaction at 55 to 59° C., 374 g. of n-butylglycol are added. After cooling the 22% strength solution has a pH-value of 5.4.

EXAMPLE 15

Equivalent ratio epoxy:amine=0.25

98.8 g. of a polyamide according to Example 1, having an amine equivalent weight of 191, are dissolved in 446 g. of tetrachlorethylene. 24 g. of glacial acetic acid are then added and the mixture is warmed to 60° C. internal temperature.

After 1½ hours the solution becomes highly viscous and is diluted with 100 g. of n-butylglycol. After 4½ hours the mixture is stirred until cold. A clear solution of low viscosity, having a solids content of 17%, is obtained. A sample of this solution has a pH-value of 4.8 after dilution with water.

EXAMPLE 16

Equivalent ratio epoxide:amine=0.25

98.8 g. of a polyamide according to Example 1 having an amine equivalent weight of 247 together with 19.1 g. of an epoxide according to Example 1 having an epoxide equivalent weight of 191 are dissolved in 100 g. of trichlorethylene and warmed to 56° C. internal temperature. After 140 minutes a sample is soluble in glacial acetic acid/water (2:19) to give a clear solution. 24 g. of glacial acetic acid are now added and the mixture diluted with 228 g. of trichlorethylene. A clear solution of low viscosity, having a solids content of 25%, is obtained. A sample of this solution has a pH-value of 5.4 after dilution with water.

EXAMPLE 17

247 g. of a polyamide according to Example 1, having an amine equivalent weight of 247 (=1 amine equivalent), are dissolved in 100 g. of ethylene glycol monobutyl ether. 13.25 g. of acrylonitrile (0.25 mols) are added thereto at room temperature, with good stirring, and the mixture is thereafter warmed to 50° C. internal temperature. After 2 hours the mixture is stirred until cold.

7 g. of ethylene glycol monobutyl ether are added to 101 g. of this product (72.8 g. of 100% strength adduct product) and the mixture is warmed to 50° C. internal temperature. A solution of 13.4 g. of an epoxide from 2,2-bis-(4'-hydroxyphenyl)propane and epichlorhydrin, having an epoxide equivalent weight of 191, and 35 g. of ethylene glycol monobutyl ether is added dropwise over the course of 30 minutes. After 1½ hours the product is dissolved in 240 g. of water to which 8.3 g. of glacial acetic acid are added.

A clear solution having a solids content of 20% and a pH-value of 6.8 is obtained.

EXAMPLE 18

Equivalent ratio epoxide:amine=0.375

19.1 g. of ethylene glycol diglycidyl ether having an epoxide equivalent weight of 127 are dissolved in 19.1 g. of methanol and warmed to 50° C. internal temperature. 98.8 g. of a polyamide according to Example 1, having an amine equivalent weight of 247, dissolved in 99 g. of methanol, are added dropwise over the course of 40 minutes with good stirring. 15 minutes after starting the addition 6 g. of glacial acetic acid are added, and this is repeated after a further 15 minutes. After completion of the dropwise addition of the polyamide solution 4 g. of glacial acetic acid are added. 20 minutes thereafter a sample is soluble in water to give a clear solution and after adding 8 g. of glacial acetic acid and 450 g. of deionised water the preparation is stirred until it has cooled to room temperature. A clear solution of low viscosity having a solids content of 20% and a pH-value of 5.5 is obtained.

EXAMPLE 19

Equivalent ratio epoxide:amine=0.28

19.1 g. of glycerine glycidyl ether having an epoxide equivalent weight of 171 are dissolved in 19.1 g. of methanol and warmed to 50° C. internal temperature. 98.8 g. of a polyamide according to Example 1, having an amine equivalent weight of 247, dissolved in 99 g. of methanol, are added dropwise over the course of 40 minutes with good stirring. 15 minutes after the start of the addition 6 g. of glacial acetic acid are added, and this is repeated after 30 minutes. After the polyamide solution has been added, 4 g. of glacial acetic acid are added.

20 minutes thereafter a sample is soluble in water to give a clear solution, and after adding a further 8 g. of glacial acetic acid and 450 g. of deionised water the preparation is stirred until it has cooled to room temperature. A clear solution of low viscosity, having a solids content of 20% and a pH-value of 5.5 is obtained.

EXAMPLE 20

Equivalent ratio epoxide:amine=0.25

98.8 g. of a polyamide according to Example 1, having an amine equivalent weight of 247, are warmed to 50° C. internal temperature in a stirred flask. A solution of 18 g. of 1,3-diglycidyl-5,5-diethylbarbituric acid (epoxide equivalent weight 180) in 18 g. of n-butylglycol, as well as 24 g. of glacial acetic acid, are added dropwise over the course of 40 minutes from two dropping funnels, with good stirring. After 2 hours a sample is soluble in water to give a clear solution. 409 g. of deionised water are now added and the mixture is stirred until the preparation has cooled to room temperature. A clear solution of low viscosity, having a solids content of 20% and a pH-value of 5.5, is obtained.

EXAMPLE 21

Equivalent ratio epoxide:amine=0.25

98.8 g. of a polyamide according to Example 1, having an amine equivalent weight of 247, are warmed to 54° C. internal temperature in a stirred flask.

A solution of 15.9 g. of trimethyladipic acid diglycidyl ester (epoxide equivalent of 159) in 15.9 g. of butylglycol, as well as 24 g. of glacial acetic acid, are added dropwise over the course of 40 minutes from two dropping funnels, wtih good stirring. After 15 minutes a sample is soluble in water to give a clear solution. 403 g. of deionised water are added and the mixture is stirred until the preparation has cooled to room temperature. A clear solution of low viscosity, having a solids content of 20% and a pH-value of 5.1, is obtained.

EXAMPLE 22

Equivalent ratio epoxide:amine=0.22

19.1 g. of a compound of formula:

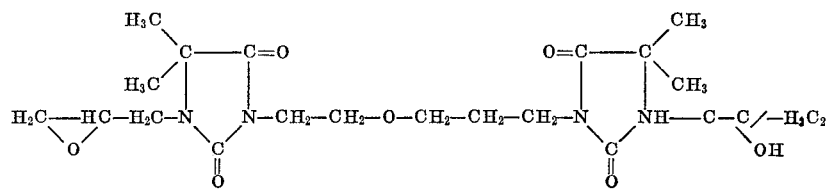

are dissolved in 19.1 g. of methanol and warmed to 52° C. internal temperature. 98.8 g. of a polyamide according to Example 1, having an amine equivalent weight of 247, dissolved in 99 g. of methanol are added dropwise over the course of 40 minutes with good stirring. 20 minutes after the start of the addition of 6 g. of glacial acetic acid are added, and this is repeated after 15 minutes. After the polyamide solution has been completely added dropwise, 4 g. of glacial acetic acid are added. 1 hour thereafter a sample is soluble in water to give a clear solution, and after adding 8 g. of glacial acetic acid and 450 g. of deionised water the preparation is stirred until it has cooled to room temperature. A clear solution of low viscosity, having a solids content of 20% and a pH-value of 5.6, is obtained.

EXAMPLE 23

Equivalent ratio epoxide:amine=0.25

98.8 g. of a polyamide according to Example 1, having an amine equivalent weight of 247, are dissolved in 50 g. of n-butylglycol and warmed to 52° C. internal temperature. 19.1 g. of an epoxide according to Example 1, having an epoxide equivalent of 191, dissolved in 47 g. of n-butylglycol, are added dropwise over the course of 30 minutes with good stirring. 25 minutes thereafter a sample is soluble in formic acid/water (1:30) to give a clear solution. 12.5 g. of formic acid and 348 g. of deionised water are now added and the mixture stirred until the preparation has cooled to room temperature. A clear solution of low viscosity, having a solids content of 20% and a pH-value of 7.0, is obtained.

A similar product is obtained if after adding the acid and the water the mixture is kept at 70° C. for a further 4 hours and only thereafter cooled.

EXAMPLE 24

Equivalent ratio epoxide:amine=0.25

98.8 g. of a polyamide according to Example 1, having an amine equivalent weight of 247, are dissolved in 50 g. of n-butylglycol and warmed to 50° C. internal temperature. 19.1 g. of an epoxide according to Example 1, having an epoxide equivalent weight of 191, dissolved in 47 g. of butylglycol are added dropwise over the course of 30 minutes with good stirring. 45 minutes thereafter a sample is soluble in 37% strength hydrochloric acid/water (1:17) to give a clear solution. 21.5 g. of 37% strength hydrochloric acid in 340 g. of deionised water are now added and the mixture stirred until the preparation has cooled to room temperature. A clear solution of low viscosity, having a solids content of 20% and a pH-value of 7.0, is obtained.

EXAMPLE 25

Equivalent ratio epoxide:amine=0.25

98.8 g. of a polyamide according to Example 1, having an amine equivalent weight of 247, are dissolved in 59 g. of 4-hydroxy-4-methyl-2-pentanone and warmed to 50° C. internal temperature. 19.1 g. of an epoxide according to Example 1, having an epoxide equivalent weight of 191, dissolved in 59 g. of 4-hydroxy-4-methyl-2-pentanone are added dropwise over the course of 30 minutes with good stirring. 1 hour thereafter a sample is soluble in glacial acetic acid/water (1:26) to give a clear solution. 13.3 g. of glacial acetic acid in 327 g. of deionised water are now added and the mixture stirred until the preparation has cooled to room temperature. A clear solution of low viscosity, having a solids content of 204 and a pH-value of 7.0, is obtained.

EXAMPLE 26

Equivalent ratio epoxide:amine=0.25

98.8 g. of a polyamide according to Example 1, having an amine equivalent weight of 247, are dissolved in 59 g. of diethylene glycol mono-n-butyl ether and warmed to 50° C. internal temperature.

19.1 g. of an epoxide according to Example 1, having an epoxide equivalent weight of 191, dissolved in 59 g. of diethylene glycol mono-n-butyl ether are added dropwise over the course of 30 minutes with good stirring. 45 minutes thereafter a sample is soluble in glacial acetic acid/water (1:28) to give a clear solution. 12 g. of glacial acetic acid in 324 g. of deionised water are now added and the mixture stirred until the preparation has cooled to room temperature. A clear solution of low viscosity, having a solids content of 20% and a pH-value of 7.0, is obtained.

EXAMPLE 27

Equivalent ratio epoxide:amine=0.25

98.8 g. of a polyamide according to Example 1, having an amine equivalent weight of 247, are dissolved in 100 g. of benzyl alcohol, 19.1 g. of an epoxide according to Example 1, having an epoxide equivalent weight of 191, are then added and the mixture is warmed to 50° C. internal temperature with good stirring. After 40 minutes a sample is soluble in glacial acetic acid/water (1:28). 6 g. of glacial acetice acid in 350 g. of deionised water are now added and the mixture stirred until the preparation has cooled to room temperature. A solution of low viscosity, having a solids content of 20% and a pH-value of 8.0, is obtained.

EXAMPLE 28

Equivalent ratio epoxide:amine=0.25

98.8 g. of a polyamide according to Example 1, having an amine equivalent weight of 247, are dissolved in 50 g. of n-butylglycol and warmed to 50° C. internal temperature. 19.1 g. of an epoxide according to Example 1, having an epoxide equivalent of 191, dissolved in 47 g. of n-butylglycol, are added dropwise over the course of 30 minutes with good stirring. 45 minutes thereafter a sample is soluble in 37% strength hydrochloric acid/water (1:17) to give a clear solution. 37.5 g. of 37% strength hydrochloric acid, dissolved in 330 g. of water, are now added and the mixture stirred until the preparation has cooled to room temperature. A clear solution of low viscosity, having a pH-value of 2.0 and a solids content of 20%, is obtained.

EXAMPLE 29

Equivalent ratio epoxy:amine=0.66

19.1 g. of an epoxide according to Example 1, having an epoxide equivalent weight of 191, are dissolved in 19.1 g. of methanol and warmed to 52° C. internal temperature. A solution of 37% of a polyamide according to Example 1, having an amine equivalent weight of 247, in 37 g. of methanol is then added dropwise over the course of 40 minutes. 15 minutes after the start of the addition 6 g. of glacial acetic acid are added and this is repeated after a further 15 minutes. After completion of the dropwise addition of the polyamide solution 4 g. of glacial acetic acid are added. 20 minutes thereafter a sample is soluble in water to give a clear solution, and after adding 8 g. of glacial acetic acid and 264 g. of deionised water the mixture is stirred until cold. A clear solution of low viscosity, having a solids content of 20% and a pH-value of 4.7, is obtained.

EXAMPLE 30

Equivalent ratio epoxy:amine=0.4

61.8 g. of a polyamide according to Example 1, having an amine equivalent weight of 247, are warmed to 55° C. internal temperature. A solution of 19.1 g. of an epoxide according to Example 1, having an epoxide equivalent weight of 191, in 19.1 g. of n-butylcarbitol, as well as 24 g. of glacial acetic acid, are then simultaneously added dropwise from two dropping funnels, over the course of 20 minutes. After 2 hours a sample is soluble in water. The preparation is diluted with 355 g. of water and stirred until it has cooled to room temperature. A clear solution of low viscosity, having a solids content of 20% and a pH-value of 4.7, is obtained.

EXAMPLE 31

Equivalent ratio epoxy:amine=0.334

The procedure indicated in Example 30 is followed but the quantity ratios of the reaction components are so chosen that the indicated equivalent ratio is maintained. A product of similar appearance, a solids content of 20% and a pH-value of 4.0 is obtained.

EXAMPLE 32

An aqueous liquor is prepared which per litre contains 30 g. of the 20% strength solution of which the manufacture is described in Example 2 and 30 g. of an aqueous silicone emulsion which in 100 parts contains 38 parts of a linear methylhydrogenpolysiloxane with ends blocked by methyl groups, having a viscosity of about 30 centipoise, and an adduct of 1 mol of stearic acid amide and 10 mols of ethylene oxide as the emulsifier. A polyester-cotton fabric is impregnated with this liquor on a padder and squeezed out to a weight increase of 45%. Thereafter the material is dried at 80° C. for 30 minutes and cured for 5 minutes at 150° C. The resulting water-repellent effect is very good and wash-resistant.

EXAMPLE 33

The procedure indicated in Example 32 is followed, but the reaction product according to Example 4 is used. The resulting water-repellent effect is again very good and resistant to washing.

EXAMPLE 34

The procedure indicated in Example 32 is followed but 7.5 g. of the reaction product according to Example 7 are used. The water-repellent effect achieved on the fabric is again very good and outstandingly resistant to washing with soap.

EXAMPLE 35

The procedure indicated in Example 32 is followed but 7.5 g. of the reaction product according to Example 11 are used. The water-repellent effect achieved is again very good and resistant to washing.

EXAMPLE 36

100 kg. of wool yarn are pre-wetted in 2000 litres of water at 60° C. in a package apparatus. The following products are then added in a diluted form or as solutions: 4000 g. of ammonium sulphate, 500 g. of the levelling agent of which the manufacture is described below, 800 g. of glacial acetic acid and 600 g. of the dyestuff of formula (1)

The mixture is heated to the boil over the course of 35 minutes and boiled for 40 minutes. The fabric is then rinsed and the fresh bath is charged with 500 g. of a reaction product of formaldehyde and naphthalene-2-sulphonic acid. The bath is warmed to 75° C. and 10,000 g. of the polyaddition product preparation according to Example 13 (20% strength solution) are now added.

After 10 minutes 4000 g. of ammonium sulphate are added, and 3000 g. of 85% strength formic acid are added after a further 15 minutes. After a further 10 minutes the fabric is rinsed, centrifuged and dried. A level blue dyeing is obtained and the goods are to be described as non-felting according to the specifications of the International Wool Secretariat.

The levelling agent is manufactured as follows:

(a) 580 parts (1 mol) of the adduct from one mol of a commercially available fatty amine which contains 35% of hexadecylamine, 25% of octadecylamine and 45% of octadecenylamine, and about 7 mols of ethylene oxide are warmed to 60–65° C. 145 parts of chloracetamide are introduced over the course of 30 minutes whilst stirring and the mixture is thereafter kept at 95 to 100° C. for 12 hours. After this it is dissolved in 622 parts of water and an approximately 50% strength solution is obtained which contains the quaternisation product.

(b) 580 parts (1 mol) of the fatty amine-ethylene oxide adduct described above under (a) are warmed to 60–65° C. 107 parts of urea are introduced in 15 minutes and 107 parts of amido-sulphonic acid are introduced in 30 minutes, and esterification is carried out for 6 hours at 95 to 100° C. Thereafter the product is dissolved in 560 parts of water and an approximately 50% strength solution is obtained which contains the ammonium salt of the acid sulphuric acid ester.

Thereafter 1 part of the quaternisation product described under (a) is mixed with 1 part of the esterified product described under (b).

EXAMPLE 37

100 kg. of combed wool tops are warmed to 80° C. in 1500 litres of water in a combed top dyeing apparatus. A dilute solution of 13,000 g. of the polyaddition compound according to Example 13 (20% strength solution) is then allowed to run in, followed after about 10 minutes by 4000 g. of ammonium sulphate dissolved in water, and after a further 15 minutes 4000 g. of 85% strength formic acid are allowed to run in in the same manner and the goods are treated for a further 10 minutes.

They are then rinsed and dyed from a fresh bath in the following manner:

The bath is warmed to 30° C., 600 g. of a reaction product of naphthalene-2-sulphonic acid and formaldehyde are added and thereafter the following products dissolved in water or diluted with water are added: 500 g. of the levelling agent described in Example 22, 200 g. of dyestuff of formula (2)

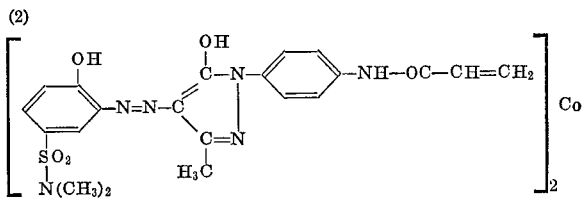

and 4000 g. of ammonium sulphate.

The mixture is heated to the boil in 60 minutes and allowed to boil for a further 60 minutes. Thereafter the goods are rinsed. The combed tops are washed on a backwasher in the following manner:

1st and 2nd bath: 50° C.; 2 g./l. of sodium 1-benzyl-2-hepta-decyl-benzimidazole-disulphonate.
3rd and 4th bath: 50° C.; water only.
The material is subsequently dried.

A level yellow dyeing of the wool results and the yarn manufactured from the combed tops is to be described as non-felting (according to the IWS Specification).

EXAMPLE 38

A knitted woollen fabric is impregnated on a two-roll padder with the following preparation, and squeezed out to a liquor uptake of 100%:

| | Parts |
|---|---|
| Preparation according to Example 16 | 60 |
| Glacial acetic acid | 10 |
| Trichlorethylene | 930 |
| Padding mix | 1000 |

The knitted fabric impregnated in this way is dried at 100° C., advantageously in a closed apparatus with solvent recovery. The knitted fabric treated in this way is non-felting according to the IWS Specifications.

EXAMPLE 39

20 kg. of ready-manufactured woollen pullovers are treated in 600 l. of trichlorethylene in a machine for treatment with solvents (such as is for example used for chemical dry-cleaning). Before adding the pullovers, 60 g./l. of preparation to Example 16 and 10 g./l. of glacial acetic acid are added to the treatment bath. The pullovers are treated for about 20 minutes with constant rotation. The treatment liquor is then pumped back into the mix container, and the pullovers are centrifuged and dried by blowing in warm air at 80 to 100° C. The pullovers treated in this way are non-felting according to the Specifications of the IWS. The treatment liquor is not depleted in preparation according to Example 16 and can be used for further batches.

EXAMPLE 40

100 kg. of cheeses of wool yarn dyed with reactive dyestuffs are wetted in a circulation apparatus in 1500 l. of water at 50° for 10 minutes.

10 kg. of the reaction product according to Example 17 are then added.

After uniform distribution of the reaction product, 4 kg. of disodium phosphate dissolved in 20 l. of water are run into the treatment bath over the course of 5 minutes. Thereafter 4 kg. of trisodium phosphate, again dissolved in 20 l. of water, are run in over the course of 15 minutes. After about 30 minutes 2 kg. of a 12.5% strength solution of a condensation product of 1 mol of octadecyl alcohol and 35 mols of ethylene oxide are further added to the bath and treatment continued for 15 minutes. The yarn is then thoroughly rinsed, centrifuged and dried for 1 hour at 80° C. The wool treated in this way is non-felting according to the ISW Specifications.

EXAMPLE 41

100 kg. of wool yarn are dyed in a hank dyeing apparatus with a dyestuff of formula

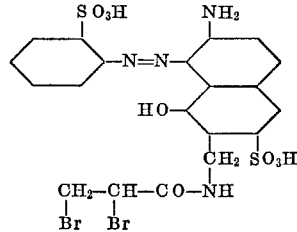

in accordance with the usual method, but neutralisation is not carried out at the end of the dyeing process. Thereafter a post-treatment is carried out at 50° C. in the following bath: 4000 litres of water, 8 kg. of the preparation according to Example 23, pH-value adjusted to 8.5 with ammonia. A fine dispersion forms in the bath, and is taken up completely onto the wool in 10 to 20 minutes. After it has been exhausted, 4 kg. of crystalline trisodium phosphate are added followed after a further 10 minutes by 2 kg. of a condensation product of 1 mol of octadecyl alcohol and 35 mols of ethylene oxide. After 15 minutes the wool is twice rinsed with cold water and dried.

The fastness to perspiration of the wool which has been dressed in this way is thereafter tested according to SNV–95824–1961, by treating the wool in one case between two pieces of woollen fabric and in the other case between two pieces of cotton fabric in an alkaline bath (pH 8.0) which per litre contains 5 g. of sodium chloride, 5 g. of crystalline disodium phosphate and 0.5 g. of histidine hydrochloride, or in an acid bath (pH 5.5) which per litre contains 5 g. of sodium chloride, 2.2 g. of crystalline monosodium phosphate and 0.5 g. of histidine hydrochloride, at a liquor ratio of 1:50, at room temperature for 30 minutes.

The colour shade of the wool and the degree of bleeding out of the pieces of woollen fabric and pieces of cotton fabric are assessed, with rating 5 denoting good fastness to perspiration and rating 1 poor fastness to perspiration. Untreated dye wool yarn is also tested, for comparison purposes:

|  | Fastness to perspiration | | | | | |
| --- | --- | --- | --- | --- | --- | --- |
|  | Alkaline perspiration | | | Acid perspiration | | |
|  | Shade | Wool | Cotton | Shade | Wool | Cotton |
| Dyed before treatment | 4 | 4–5 | 3 | 4–5 | 4–5 | 3–4 |
| Dyed after treatment | 4–5 | 5 | 4–5 | 4–5 | 5 | 4–5 |

The same effects are achieved with dyestuffs of formulae

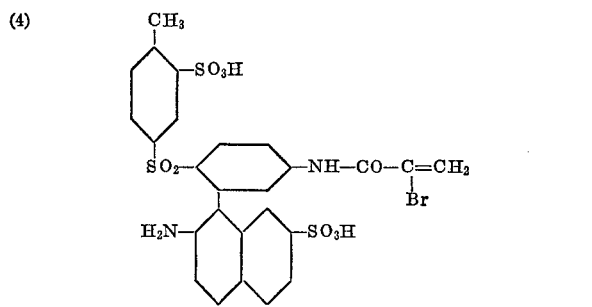

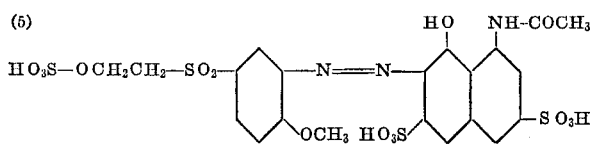

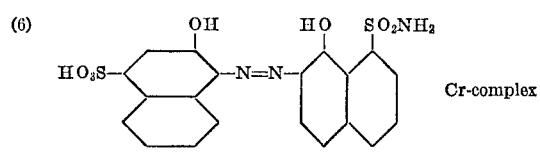

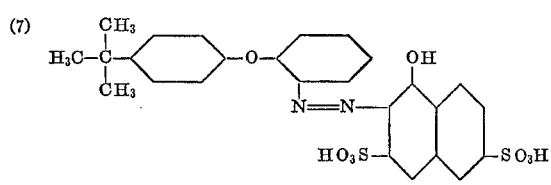

EXAMPLE 42

100 kg. cheeses are dyed with reactive dyestuffs in the usual manner in a cheese dyeing apparatus in 1000 litres of water. After finishing the dyeing, the following liquor is prepared in the mix container of the dyeing apparatus: 1000 litres of water, 1500 g. of 25% strength ammonia, 9000 g. of preparation according to Example 23; temperature 50° C.

This treatment liquor is then pumped into the dyeing apparatus. The direction of flow of the liquor is changed every 3 to 5 minutes. After 20 minutes 4 kg. of crystalline trisodium phosphate are added to the bath followed after a further 10 minutes by 2 kg. of a condensation product of 1 mol of octadecyl alcohol and 35 mols of ethylene oxide. After 15 minutes the cheeses are twice rinsed with cold water and dried. Knitted pieces are produced from the wool yarn. These show the following improvement in mechanical properties compared to knitted pieces which have not been finished:

Tear strength: 20% increase
Elongation at break: 11% increase
Abrasion resistance: 11% increase
Tendency to pilling: 50% improvement

EXAMPLE 43

Double-knit tricot of pure wool is padded on a Zwickel two-roll padder with the following preparation: 100 g./l. of preparation according to Example 23, 20 g./l. of 33% strength $H_2O_2$, 40 g./l. of a condensation product of 1 mol of octadecyl alcohol and 35 mols of ethylene oxide, 5 g./l. of a 38% strength aqueous polysiloxane emulsion and 2 g./l. of a condensation product of 1 mol of p-tert.-octylphenol and 8 mols of ethylene oxide. The liquor uptake (squeezing-out effect) is 80%. After leaving the padder the tricot is immediately dried at 80° C. on a stenter frame. The tricot which has been treated in this way is non-felting according to IWS Specifications 7B.

EXAMPLE 44

Aqueous liquors of the following composition are prepared: 80 g./l. of a 50% strength aqueous solution containing 1 mol each of hexamethylolamine-hexamethyl ether and dimethylethyleneurea, 80 g./l. of a preparation of one of Examples 1, 2, 3, 29, 30 and 31, and 12 g./l. of magnesium chloride.

Cotton fabrics are impregnated with these liquors on a padder and squeezed out to a weight uptake of 45%. Thereafter the fabric is dried at 80° C. for 30 minutes, followed by 45 minutes curing at 150° C.

A "soil release" effect which is very good and resistant to washing is achieved.

EXAMPLE 45

Bleached sulphite pulp or cream-colour sulphite pulp is ground in a hood-type hollander at 4% pulp consistency to a degree of grinding of 30° SR, or 40° SR. This material is diluted to 2% pulp consistency.

1% strength solutions of the preparation according to Example 3 are added to 500 ml. at a time of these pulp suspensions, so that relative to the dry fibre material the following percentages of 100% strength preparation according to Example 3 are present in the preparations: (a) 0.04%, (b) 0.2% and (c) 0.6%. Additionally, 2% of a resin glue and 3% of aluminum sulphate (relative to the dry fibre material) are added to the preparations of the cream-colour sulphite pulp.

6 preparations are thus obtained, 3 with bleached sulphite pulp and 3 with cream-colour sulphite pulp. The 6 preparations are stirred for 15 minutes, then diluted with water to 1% pulp consistency, and thereafter, following additional dilution to 0.3% pulp consistency, a sheet is formed on a sheet-forming apparatus which after drying has a total weight of 100 g./m.². The sheets are subsequently dried on a stream-heated drying cylinder for 10 minutes at 105° C.

The sheets thus obtained are subsequently tested for their relative wet tear strength by the test according to USPPF 1061, and the preparation according to Example 3 proves to be a good material for conferring wet strength.

The results of the tests are summarised in the table below:

| Pulp | Percent of— | | |
|---|---|---|---|
| | Amount employed | Relative wet strength | Relative wet bursting pressure |
| Bleached sulphite pulp | 0.04 | 6.0 | 11.9 |
| | 0.2 | 13.9 | 19.5 |
| | 0.6 | 20.0 | 24.5 |
| | (¹) | 4.0 | <5.0 |
| Cream-colour sulphite pulp | 0.04 | 8.5 | 12.1 |
| | 0.2 | 18.6 | 28.0 |
| | 0.6 | 25.6 | 35.8 |
| | (¹) | 6.0 | <5.0 |

¹ Without additive.

We claim:
1. A stable water-soluble or water dispersible composition of polyaddition products which are obtained by reacting (a) an epoxide containing at least two epoxide groups in an equivalent ratio of 1:1 to 1:5 with (b) a basic polyamide prepared by the reaction of a mixture of dimerized and trimerized linoleic or linolenic acid and a polyamine of the formula:

$$H_2N-(CH_2CH_2-NH)_n-CH_2-CH_2-NH_2$$

wherein $n$ is a whole number of at most 3 in the presence of an organic solvent at a temperature of from 25–80° C., and thereafter adjusting the pH-value, not later than after completion of the polyaddition reaction, to 2 to 8, by adding an acid to said polyaddition product reaction mixture.

2. A stable preparation according to claim 1, characterized in that epoxides having an epoxy equivalent of at most 1000 are used as component (a).

3. A stable preparation according to claim 1, characterized in that epoxides from 2,2-bis-(4'-hydroxyphenyl)-propane and epichlorohydrin having an epoxy equivalent of at most 1000 are used as component (a).

4. A stable preparation according to claim 1, characterized in that the pH-value is adjusted with aliphatic carboxylic acids having 1 to 3 carbon atoms.

5. A stable preparation according to claim 1, characterized in that the temperature for reacting components (a) and (b) is 45 to 70° C.

6. A stable preparation according to claim 1, characterized in that the reaction of components (a) and (b) is carried out in the presence of a water-soluble organic solvent and that the pH-value of the reaction mixture is adjusted to a value of 2 to 7.

7. A stable preparation according to claim 1, characterized in that the polyaddition product is obtained by reacting (a) an epoxide of 2,2-bis-(4'-hydroxy-phenyl)-propane and epichlorohydrin with (b) a condensation product of dimerised to trimerised linoleic acid and diethylenetriamine in the presence of n-butylglycol.

8. A process for the manufacture of a stable water-soluble or water-dispersible composition of polyaddition products from epoxides and amino compounds, which comprises reacting (a) an epoxide containing at least two epoxy groups in an equivalent ratio of 1:1 to 1:5 with (b) a basic polyamide prepared by the reaction of a mixture of dimerized and trimerized linoleic or linolenic acid and a polyamine of the formula $$H_2N-(CH_2-CH_2-NH)_n-CH_2-CH_2-NH_2$$

wherein $n$ is a whole number of at most 3 in the presence of an organic solvent at a temperature of from 25 to 80° C., and thereafter adjusting the pH-value, not later than after completion of the polyaddition reaction, to 2–8, by adding an acid to said polyaddition product reaction mixture.

References Cited
UNITED STATES PATENTS

| | | | |
|---|---|---|---|
| 2,760,944 | 8/1956 | Greenlee | 260—18 |
| 2,811,495 | 10/1957 | Wittcoff et al. | 260—29.2 |
| 2,824,848 | 2/1958 | Wittcoff | 260—18 |
| 3,062,773 | 11/1962 | Rogier | 260—18 |
| 3,248,280 | 4/1966 | Hyland | 260—18 |

DONALD E. CZAJA, Primary Examiner

E. C. RZUCIDLO, Assistant Examiner

U.S. Cl. X.R.

117—139.5; 260—18 N, 29.2 N, 37 N